Jan. 28, 1947.　　　H. T. BUDENBOM　　　2,414,798
DIRECTION FINDER
Filed June 28, 1941　　　2 Sheets-Sheet 1
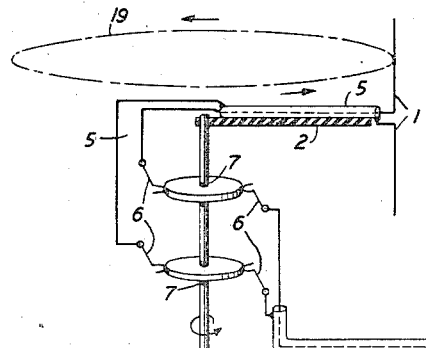
FIG.1
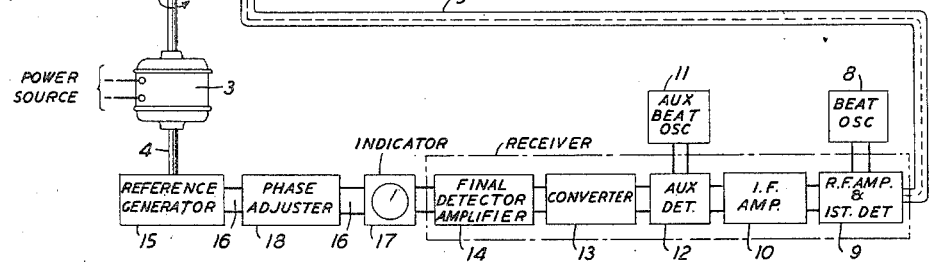
FIG.2
NORTH (REFERENCE DIRECTION)
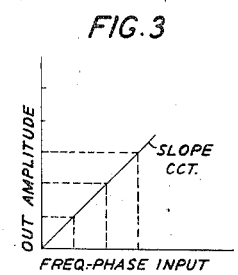
FIG.3
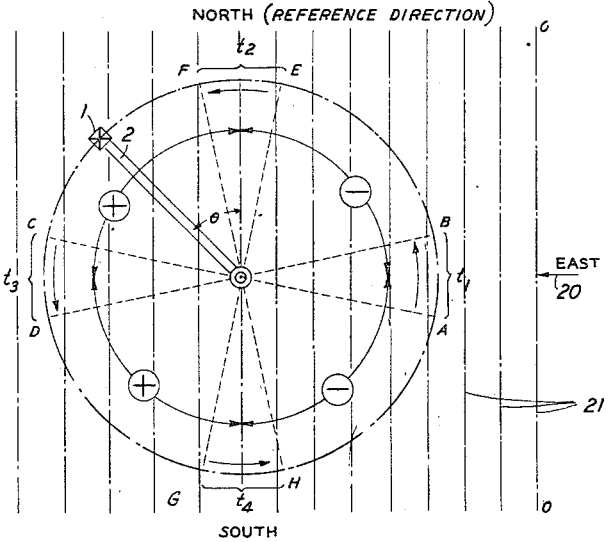
INVENTOR
H. T. BUDENBOM
BY A. J. Zerbarini
ATTORNEY Jan. 28, 1947.       H. T. BUDENBOM       2,414,798
DIRECTION FINDER
Filed June 28, 1941        2 Sheets—Sheet 2
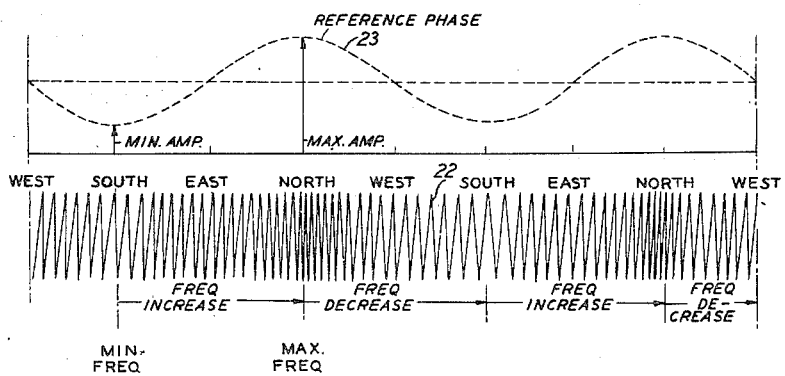
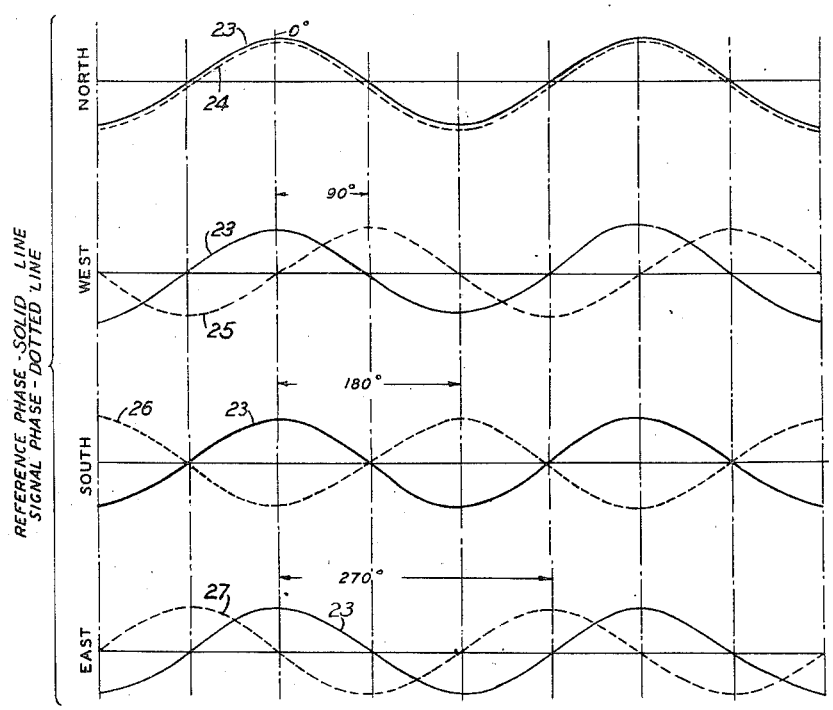
INVENTOR
H. T. BUDENBOM
BY
ATTORNEY Patented Jan. 28, 1947

2,414,798

UNITED STATES PATENT OFFICE 2,414,798

DIRECTION FINDER

Horace T. Budenbom, Short Hills, N. J., assignor to Bell Telephone Laboratories, Incorporated, New York, N. Y., a corporation of New York Application June 28, 1941, Serial No. 400,251

6 Claims. (Cl. 250—11)

This invention relates to direction-finding methods and systems and, more particularly, to short and ultra-short wave direction-finding methods and systems of the phase comparison type.

As is known, various types of direction-finding systems based on a phase comparison of two wave components received from a distant station or two components one of which is received from a distant station and the other of which is locally generated, have been suggested for use with short waves of the order of 10 to 200 meters. In general, these systems comprise two vertical antennas, are relatively cumbersome and, because of mutual coupling between antennas, are not completely satisfactory. It now appears desirable to determine the incoming direction of short waves, and particularly ultra-short waves, accurately and instantaneously in a simple manner utilizing only a single linear antenna element.

It is one object of this invention to determine the direction of arrival, in any given plane, of radio waves.

It is another object of this invention to ascertain the line direction and the sense of incoming waves utilizing only a single antenna.

It is still another object of this invention to determine the incoming direction of quasi-optical waves in an accurate and efficient manner utilizing a minimum amount of equipment.

According to one embodiment of the invention, a vertical dipole is positioned at the outermost end of a horizontal yard or arm which is supported at its other end by a vertical shaft and rotated in a horizontal plane at a given low frequency rate, as. for example, 3 to 30 revolutions per second. Assuming the direction of the incoming wave is substantially horizontal, the dipole traverses a large number of differently phased wave fronts during each revolution. The relative phase of the carrier or radio voltage induced in the dipole increases and decreases cyclically as the dipole moves first away from and then toward the distant station. The induced voltage is, in effect, phase modulated at a frequency related to the rotating speed of the shaft and it has an absolute phase, or phase angle, which is a function of the direction of the incoming wave. Stated differently, the rate of phase change or rate of frequency change is a maximum when the dipole moves in a direction parallel to the wave direction or path and a minimum or zero when it moves perpendicularly thereto and, considering the two periods in each revolution during which the rate of phase change is a maximum, the phase or frequency changes are in opposite sense. The induced energy is supplied to a receiver containing a slope circuit which converts the phase or frequency modulated wave into an amplitude modulated wave. The azimuth and sense of the incoming wave are then determined by comparing the phase of the detected amplitude modulated wave with that of a current supplied by a reference generator driven by the shaft mentioned above.

Referring to the drawings, the invention will be more fully understood from a perusal of the following specification taken in conjunction with the drawings, on which like reference characters denote elements of similar function and, on which:

Fig. 1 illustrates one embodiment of the invention; and

Figs. 2, 3, 4 and 5 are diagrams used in explaining the invention.

Referring to Fig. 1, reference numeral 1 designates a vertical dipole antenna mounted on one end of a horizontal wooden arm 2 which is caused to revolve at a low frequency rate by means of the motor 3 and vertical shaft 4. The dipole is connected by line 5 and the double slip ring assembly 6 to a radio receiver, the slip rings in assembly 6 being insulated from each other and from shaft 4 by the insulating collars 7. The receiver comprises a beat oscillator 8, radio frequency amplifier and first detector 9, intermediate frequency amplifier 10. auxiliary beat oscillator 11, auxiliary detector 12. converter 13 containing a slope circuit, and final detector 14 containing an audio amplifier. Numeral 15 denotes a reference generator which may be of any conventional type or of the bridge potentiometer type disclosed in my copending application Serial No. 403,693, filed July 23, 1941. The generator 15 and output terminals of final detector 14 are connected by lines 16 to a phase indicator 17. Reference numeral 18 designates a phase adjuster included between the local reference generator 15 and indicator 17 for adjusting the phase of the low frequency generator current with respect to a given reference compass point direction as, for example, north. If the potentiometer type generator is used, the phase adjuster forms part of the generator. Preferably, the phase indicator is of the cathode ray tube type similar to that disclosed in Patents 1,586,533, June 1, 1926 and 2,006,698, July 2, 1935 both granted to E. Peterson. Reference number 19 designates the circular path in the horizontal or azimuthal plane described by the revolving dipole.

Referring to Figs. 2, 3, 4 and 5, the operation of the system will now be explained. Assuming arrow 20 represents the incoming horizontal direction of the wave and the broken parallel lines 21 represent differently phased wave fronts, the dipole 1 travels along the path 19 and traverses during each revolution a large number of wave fronts. During the time $t_1$ when the dipole travels along the arc A—B, which is substantially perpendicular to the wave-direction 20, it intersects a minimum number of wave fronts. Similarly during the time $t_3$ when it travels along the opposite arc C—D, $t_1$ being equal to $t_3$, it intersects a minimum number of wave fronts. Also during each of the time intervals $t_2$ and $t_4$, each of which is equal to $t_1$, the dipole travels along the arcs E—F and G—H, respectively, and intersects a maximum number of wave fronts. Hence the phase, and therefore the instantaneous carrier frequency of the voltage induced in the dipole antenna, are increased a maximum amount during the period $t_4$ and decreased a maximum amount during the period $t_2$, since the dipole is moving counter-clockwise; and the phase remains substantially constant during the intervals $t_1$ and $t_3$, whereby the phase and frequency of the dipole voltage are cyclically varied at a rate dependent upon the angular velocity of the arm. More particularly, the rates of phase change during periods $t_2$ and $t_4$ are equal but the changes are in different directions. Similarly, the changes in phase during the periods $t_1$ and $t_3$ are equal but of different sense.

The phase-modulated dipole carrier current is supplied, together with the beat frequency current from oscillator 8, to the first detector 9 of the receiver. The resulting intermediate frequency current, after amplification by amplifier 10 is fed, together with the auxiliary beat frequency current from oscillator 11, to the auxiliary detector 12. The output current of detector 12 is then delivered to the converter 13 which functions to transform the phase or frequency modulated wave into an amplitude modulated wave, as in conventional frequency modulated receiving systems and is disclosed in the article "Amplitude, phase and frequency modulation," by H. Roder, published in the Proceedings of the Institute of Radio Engineers, December 1931, page 2145, especially page 2151. After conversion the amplitude modulated signal wave is detected in the final detector and the phase of the detected current having a value, as explained below dependent upon the incoming azimuthal wave direction, is then compared by indicator 17 with the phase of the reference current supplied by generator 15 through the phase adjuster 18. The adjuster 18 is preferably manipulated so that a predetermined value of the reference current occurs when the arm is pointed north.

As shown by Fig. 3, which illustrates the characteristic of the slope circuit included in the converter 13, the output amplitude of the converter changes directly with change in frequency. Also, curves 22 and 23 of Fig. 4 show, respectively, the frequency variation in the input circuit and the amplitude variation or envelope in the output circuit of the converter 13. The auxiliary oscillator 11 and the auxiliary detector 12 may, if desired, be omitted and the slope circuit may be designed for converting a frequency modulated intermediate frequency wave of relatively high frequency into an amplitude modulated wave. A more accurate conversion may be obtained, however, as is apparent from Fig. 3, by utilizing the auxiliary oscillator 11 and the auxiliary detector 12, and converting the resulting frequency-modulated intermediate frequency wave of relatively low frequency into an amplitude modulated wave, inasmuch as the overall frequency change or frequency modulated band is a greater percentage of the mean frequency and for a given band of modulating frequencies a larger amplitude variation is obtained.

Referring to Fig. 2, the voltage induced in the dipole by the incoming wave may be represented by the following equation:

$$E = E_{max} \sin 2\pi F\left(T - \frac{D}{C} - l \sin \theta\right) \quad (1)$$

where,
F = the carrier frequency of the incoming wave,
E = the instantaneous amplitude value,
$E_{max}$ = the maximum voltage amplitude,
D = the distance from the stationary distant transmitter to the vertical axis of the system coinciding with shaft 4.
C = velocity of wave propagation in the ether,
T = time in seconds determining the absolute phase of the wave as emitted at the distant transmitter and is assumed to be a constant,
$l$ = the length of the arm,
$\theta$ = the angle between the arm and the wave front of the incoming wave. $\theta$ has a zero value twice every revolution of the arm, that is, $\theta$ goes through (+) and (—) quadrants during each revolution, as indicated in Fig. 2.

The terms $E_{max}$, $\pi$, D, C, T, F and D/C are constants. Hence, letting $2\pi F = R$, the phase of the dipole voltage is proportional to $$\sin (RT - l \sin \theta) \quad (2)$$

the constant retardation D/C being disregarded. Now $$\theta = ST \quad (3)$$

where S is the arm angular velocity, or arm revolution frequency divided by $2\pi$.

Hence, the dipole voltage is proportional to $$\sin (RT - l \sin ST) \quad (4)$$

The above discussion, which assumes the distant source transmitter to be east of the direction finder location, shows that the maximum rate of phase variation, and consequently the maximum excursions of receiver output, occur at the instants when the revolving arm is in the plane of the wave front. The receiver output is thus a cosine function of the angle between the arm and the wave front. It is therefore a sine function of the angle between the arm and the transmitter direction. Obviously, the transmitter may have a compass point direction other than the easterly direction assumed for purpose of explanation. If a reference phase generator supplying a frequency $$\frac{S}{2\pi}$$

is connected to the antenna drive shaft in a manner such that its output passes through zero when the antenna is in the reference north position, the phase of the generated reference wave is a sine function having zero value when the antenna passes through the aforementioned north position. It will now be clear that if the distant station is located directly north of the direction finding system, the receiver output and reference voltages will be in phase. Moreover, since the receiver output phase is determined by the distant station's azimuth, and follows its variation, it results that the phase difference between the receiver and reference outputs is exactly equal to the azimuth angle, referred to north.

Assuming, as shown in Fig. 2, the reference direction is north and the wave arrival direction is also north, the phase angle difference indicated by the phase indicator 17 is zero, as shown in Fig. 5 by the coincidence of curve 23 representing the phase of the reference wave and curve 24 representing the phase of the incoming signal wave. For the westerly incoming direction the phase angle difference is 90 degrees, as illustrated by the displacement of the reference curve 23 and the signal curve 25. For the southerly incoming direction, the phase angle difference is 180 degrees, as illustrated by the displacement of the reference curve 23 and the signal curve 26, and for the easterly incoming direction, the phase angle difference is 270 degrees as illustrated by the displacement of the reference curve 23 and the signal curve 27, Fig. 5.

It has thus been shown that in accordance with the invention both the line direction and the sense or point-direction in any given plane, for example, the azimuthal plane, may be instantaneously determined in a simple manner utilizing a single vertical antenna and a single receiver. While the invention is suitable for use for determining the incoming direction of waves having any wave-length, it is expected that the invention will find its greatest utility in connection with wave-lengths shorter than 10 meters since its accuracy is a function of the arm length $l$ in wave-lengths. It should be observed, assuming the system is employed for azimuthal direction determination, that the existence of a vertical wave arrival angle in no way affects the accuracy of the system. As previously indicated, the system of the invention is entirely free from interaction and coupling effects, such as encountered in the fixed Adcock system and in other systems comprising an array of antenna elements.

Although the invention has been explained in connection with a certain embodiment thereof, it is understood that it is not to be limited to the apparatus illustrated since other means may be satisfactorily employed in practicing the invention. Other types of antennas may be used, and the antenna and its plane of revolution may be oriented for direction determination in any plane.

What is claimed is:

1. A direction finder comprising an antenna for receiving waves from a particular transmitting station, means for cyclically and harmonically changing the distance between said antenna and station at a rate correspondent to a low frequency angular velocity, means for obtaining from the received energy a current representing the phase modulation produced in the received energy by movement of said antenna and having a phase angle related to the direction and sense of said wave, and means for comparing the phase of said current with that of a current representing a reference direction.

2. A direction finder comprising a vertical non-directional antenna for receiving waves from a particular transmitting station, means for moving said antenna cyclically and at a given rate toward and away from said station, means for obtaining from the received energy a current having a frequency equal to said rate and a phase related to the direction and sense of said waves, means for obtaining a reference current of the same frequency and having a phase related to a reference direction, and means for determining the phase relation of said currents.

3. In a direction-finding system, a vertical antenna, means for causing said antenna to move continuously at a constant speed and along a circular path in a horizontal plane, means comprising a frequency modulation-amplitude modulation converter for obtaining from the antenna energy a current representing the antenna energy and having a frequency corresponding to said speed and a phase depending upon the direction and sense of the received wave, means for obtaining a reference current of said frequency, and means for ascertaining the phase relation of said currents.

4. The method of determining the directional sense of a wave incoming from a given station, utilizing a movable non-directional antenna connected to a receiver, which comprises moving at a given cyclic rate said antenna so as to impress on the received energy a frequency modulation related to said directional sense, obtaining from the frequency modulated received energy a current representing said energy and having a frequency equal to said rate and a phase angle corresponding to said directional sense, obtaining a reference compass current having the same frequency and a phase related to a reference compass point direction, and ascertaining the phase relation of said currents.

5. In a direction finding system, a vertical antenna, a receiver connected thereto, means for causing said antenna to move continuously along a circular path in a horizontal plane and at a constant speed in the order of three to thirty revolutions per second, a converter included in said receiver for obtaining from the phase modulated antenna energy an amplitude modulated wave representing the phase modulated dipole energy, a detector connected to said converter for securing a current having a frequency equal to said speed and a phase related to the compass point direction of the incoming wave, and means for comparing the phase of said current with that of a current representing a reference compass point direction.

6. In combination, a vertical antenna for continuously receiving energy from a given transmitting antenna, said antenna having a non-directional horizontal plane characteristic and being positioned at one end of a horizontal arm, said arm being attached to a vertical shaft, means for causing said shaft to revolve at a constant speed in the order of three to thirty revolutions per second, receiving means connected to said antenna and including means for obtaining from the phase modulated antenna energy a current having a frequency dependent upon the speed of rotation and a phase dependent upon the direction and sense of said received wave, means for generating a reference current having a frequency equal to said frequency and a phase related to a reference compass point direction, and means comprising a cathode ray tube for indicating the phase relation of said currents, whereby the direction and the sense of said incoming wave may be ascertained.

HORACE T. BUDENBOM.